(12) United States Patent
Korn et al.

(10) Patent No.: US 9,631,875 B2
(45) Date of Patent: Apr. 25, 2017

(54) HEAT EXCHANGER FOR COOLING A FLUID OF AN INTERNAL COMBUSTION ENGINE, ASSEMBLY WITH AT LEAST ONE HEAT EXCHANGER AND METHOD FOR MANUFACTURING A HEAT EXCHANGER

(71) Applicant: MANN+HUMMEL GMBH, Ludwigsburg (DE)

(72) Inventors: Alexander Korn, Gueglingen (DE); Heinz Buehl, Erlenbach (DE); Achim Rehmann, Kieselbronn (DE); Herbert Pietrowski, Pleidelsheim (DE); Gerrit-Tobias Speidel, Ludwigsburg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 530 days.

(21) Appl. No.: 13/932,358

(22) Filed: Jul. 1, 2013

(65) Prior Publication Data
US 2014/0000850 A1    Jan. 2, 2014

(30) Foreign Application Priority Data

Jun. 29, 2012   (DE) .......................... 10 2012 012 939

(51) Int. Cl.
*F28F 1/00*     (2006.01)
*B23P 15/26*    (2006.01)
(Continued)

(52) U.S. Cl.
CPC ................ *F28F 1/00* (2013.01); *B23P 15/26* (2013.01); *F28D 7/0041* (2013.01); *F28D 7/163* (2013.01);
(Continued)

(58) Field of Classification Search
CPC .. F28F 1/00; F28F 1/006; F28F 21/062; F28F 2275/025; F28D 7/163; F28D 21/0003; B23P 15/26; Y10T 29/49361
(Continued)

(56) References Cited

U.S. PATENT DOCUMENTS

| 3,277,959 A | * | 10/1966 | Withers | ................. B29C 65/02 165/159 |
| 3,315,740 A | * | 4/1967 | Withers | ................. B01D 1/06 156/196 |
| 4,367,139 A | * | 1/1983 | Graham | ................. B01D 53/22 210/321.9 |

(Continued)

FOREIGN PATENT DOCUMENTS

| DE | 612926 | | 5/1935 | |
| DE | 612926 C | * | 5/1935 | ............ F28D 7/005 |
| DE | 3140687 A1 | | 4/1983 | |

*Primary Examiner* — Allana Lewin Bidder
*Assistant Examiner* — Raheena Rehman
(74) *Attorney, Agent, or Firm* — James Hasselbeck

(57) ABSTRACT

A heat exchanger (10) cooling a fluid and a method for manufacturing, the heat exchanger (10) having an outer pipe section (12) in which a plurality of inner pipe sections (36) with channels for the fluid to be cooled are disposed. At least one cooling fluid channel (56) is disposed in the outer pipe section (12). The at least one cooling fluid channel (56) and the at least one channel for the fluid to be cooled are in heat contact and fluidically separated from each other. A plurality of inner pipe sections (36) open on both ends (38, 46) form of a pipe bundle (34) having ends fixed tightly in a corresponding lead-through opening (40) of an upstream end body (42) and fixed tightly with the other end (46) in a corresponding lead-through opening (48) of a downstream end body (50).

9 Claims, 12 Drawing Sheets

(51) Int. Cl.
*F28F 21/06* (2006.01)
*F28D 7/16* (2006.01)
*F28D 21/00* (2006.01)
*F28D 7/00* (2006.01)

(52) U.S. Cl.
CPC .......... *F28D 21/0003* (2013.01); *F28F 1/006* (2013.01); *F28F 21/062* (2013.01); *F28F 2275/025* (2013.01); *Y10T 29/49361* (2015.01)

(58) Field of Classification Search
USPC .................................................. 165/158, 160
See application file for complete search history.

(56) References Cited

U.S. PATENT DOCUMENTS

| | | | | |
|---|---|---|---|---|
| 4,643,244 A | * | 2/1987 | Bosworth | F28D 7/0058 165/158 |
| 4,763,725 A | * | 8/1988 | Longsworth | F25B 9/02 165/147 |
| 4,871,014 A | * | 10/1989 | Sulzberger | F17D 5/04 165/158 |
| 5,058,661 A | * | 10/1991 | Oshiyama | A61M 5/44 165/11.1 |
| 5,192,499 A | * | 3/1993 | Sakai | A61M 1/1698 128/DIG. 3 |
| 2003/0178187 A1 | * | 9/2003 | Wanni | F28F 9/0137 165/162 |
| 2003/0196781 A1 | * | 10/2003 | Wanni | F28D 7/16 165/82 |
| 2005/0067153 A1 | * | 3/2005 | Wu | F02M 25/0737 165/158 |
| 2007/0131400 A1 | * | 6/2007 | Gracia | F02M 25/0731 165/158 |
| 2008/0245507 A1 | * | 10/2008 | Agee | F02M 25/0737 165/83 |
| 2012/0312514 A1 | | 12/2012 | Erickson | |

* cited by examiner

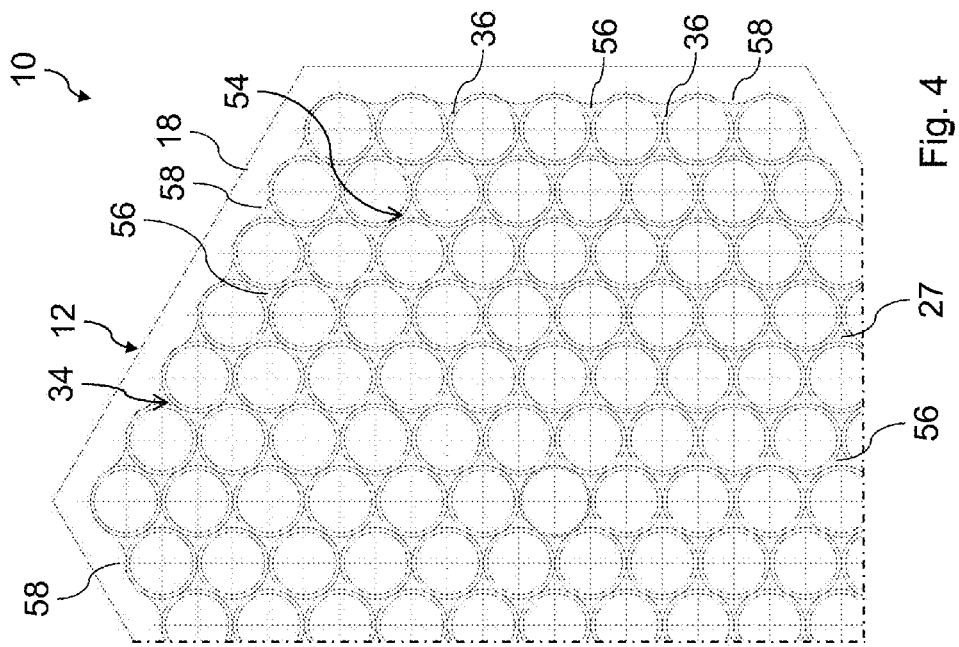
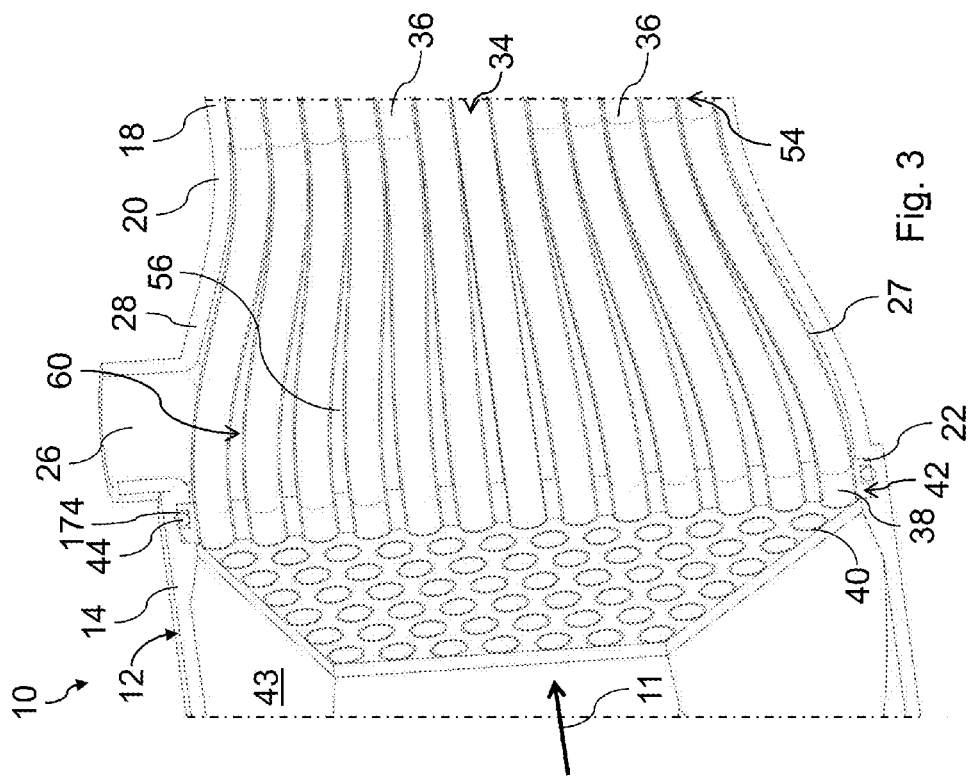

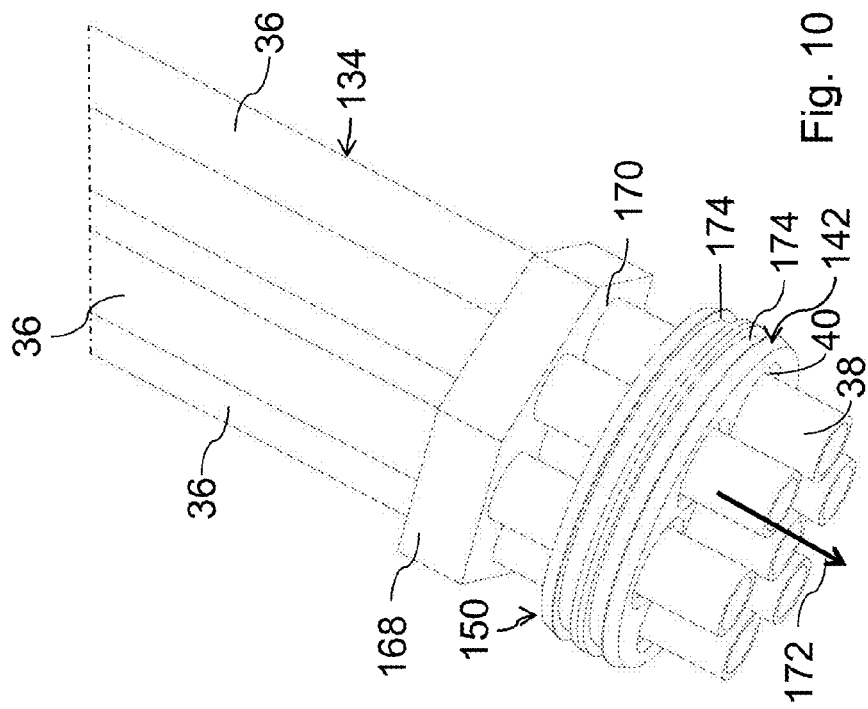
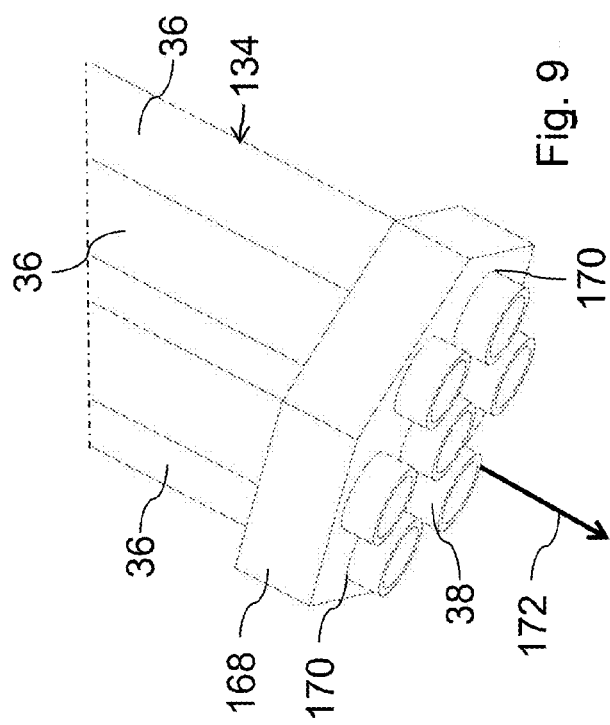

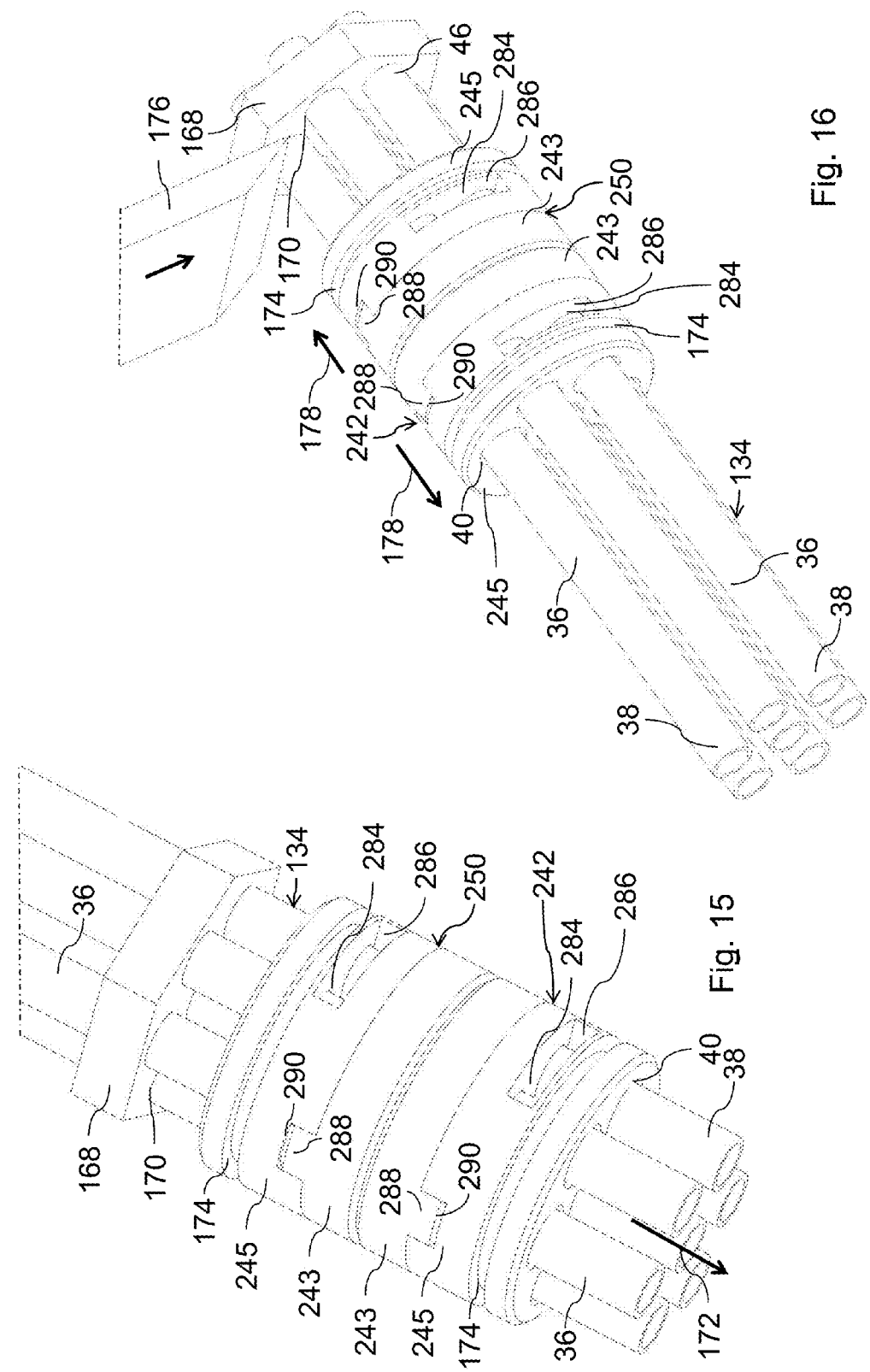

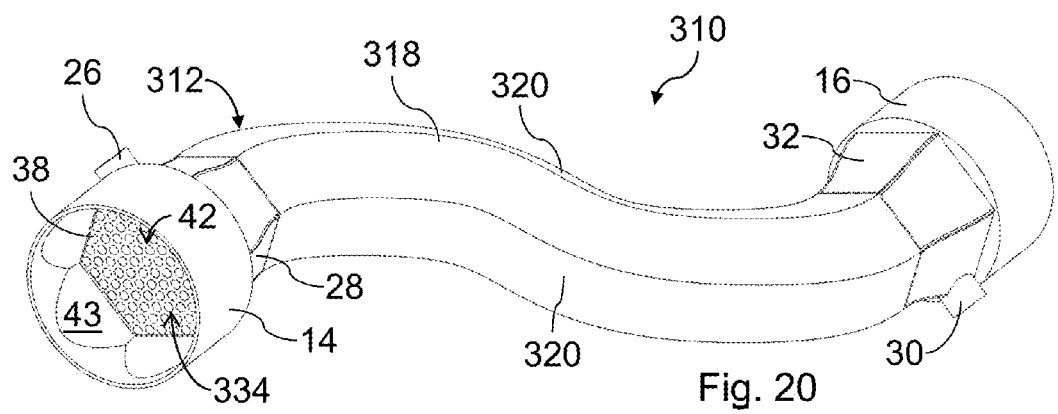
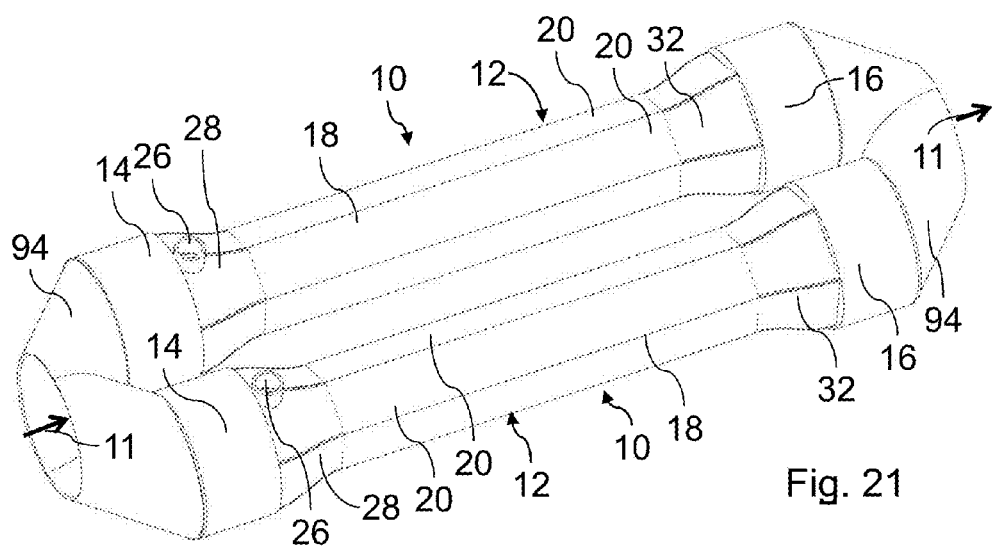

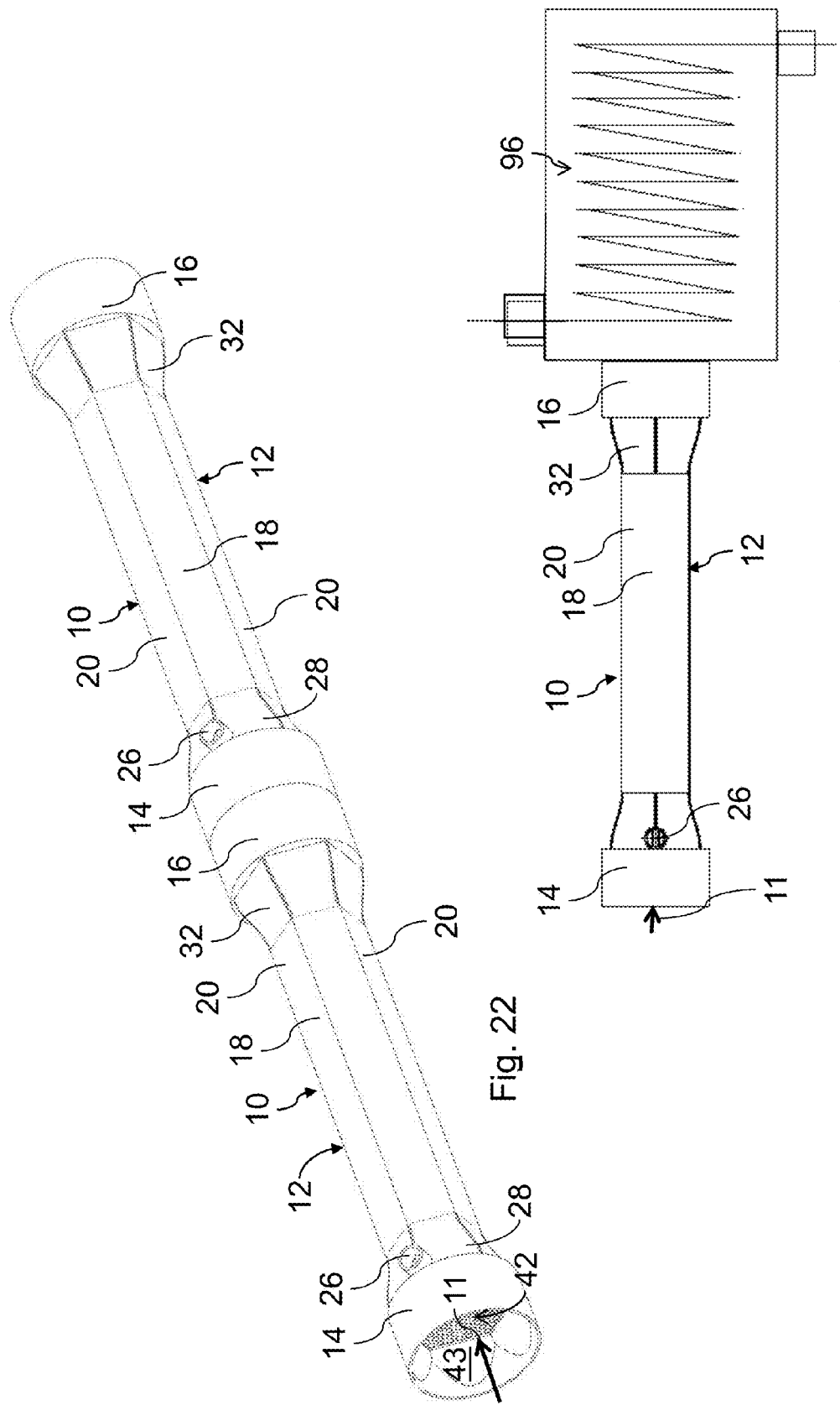

HEAT EXCHANGER FOR COOLING A FLUID OF AN INTERNAL COMBUSTION ENGINE, ASSEMBLY WITH AT LEAST ONE HEAT EXCHANGER AND METHOD FOR MANUFACTURING A HEAT EXCHANGER

CROSS REFERENCE TO RELATED APPLICATIONS

This application claims the benefit under 35 USC 119 of foreign application DE 102012012939.4 filed in Germany on Jun. 29, 2012, and which is hereby incorporated by reference in its entirety.

TECHNICAL FIELD

The invention relates to a heat exchanger for cooling a fluid of an internal combustion engine, in particular a charging fluid of a charged internal combustion engine, in particular of a motor vehicle, featuring an outer pipe section, in which are disposed at least one inner pipe section with at least one channel for the fluid to be cooled and in which is disposed at least one cooling fluid channel for a cooling fluid, the at least one cooling fluid channel and the at least one channel for the fluid to be cooled being in heat contact and separated fluid-tightly from each other.

Furthermore, the invention relates to an assembly with at least one heat exchanger for cooling a fluid of an internal combustion engine, in particular a charging fluid, in particular of a motor vehicle, featuring an outer pipe section, in which are disposed at least one inner pipe section with at least one channel for the fluid to be cooled and in which is disposed at least one cooling channel for a cooling fluid, the at least one cooling channel and the at least one channel for the fluid to be cooled being sealed fluid-tightly against each other and in heat contact.

Furthermore, the invention relates to a method for manufacturing a heat exchanger for cooling a fluid of an internal combustion engine, in particular a charging fluid of a charged internal combustion engine, for example turbocharged, in particular of a motor vehicle.

BACKGROUND OF THE INVENTION

A heat exchanger for cooling a fluid for an internal combustion engine, in particular a gas, for example in the form of a charging fluid such a exhaust gas, charge air, mixtures thereof or the like, in particular for an internal combustion engine of a motor vehicle, preferably gas cooler, is known from WO 2008/034604 A2. The heat exchanger features an inner pipe component with at least one channel for guiding the fluid to be cooled and an outer pipe component. A liquid coolant is guided in a gap between the outer pipe component and the inner pipe component.

SUMMARY OF THE INVENTION

An object of the invention is to design a heat exchanger, an assembly with at least one heat exchanger and a method for manufacturing a heat exchanger in which a most efficient heat exchange between the fluid to be cooled and the cooling fluid can be easily realized at the lowest possible dimensions of the heat exchanger.

This object is achieved according to the invention in that a plurality of inner pipe sections, which are open at both ends, are disposed in the form of a pipe bundle and that the inner pipe sections are attached each with one end tightly in a respective lead-through opening of an upstream end body and attached each with the other end tightly in a respective lead-through opening of a downstream end body, and that the upstream end body separates fluid-tightly an inlet chamber of the outer pipe section from a coolant chamber, which comprises the at least one cooling fluid channel, and that the downstream end body separates fluid-tightly an outlet chamber of the outer pipe section from the coolant chamber and that the inner pipe sections connect the inlet chamber with the outlet chamber.

According to the invention, a pipe bundle is provided, which features a plurality of inner pipe sections. The pipe bundle is disposed in the coolant chamber of the outer pipe section. The two end bodies are used to limit the coolant chamber. Gaps between the inner pipe sections are used as cooling fluid channels for the cooling fluid. During operation of the heat exchanger, the cooling fluid flows through the coolant chamber in the gaps between the inner pipe sections as well as between the inner pipe sections and a radially inner peripheral wall of the coolant chamber. The fluid to be cooled flows through the inner pipe sections. During operation of the heat exchanger according to a counter-current process the flow of the cooling fluid in the cooling fluid channels can be oppositely directed to the flow of the fluid to be cooled in the inner pipe sections. Alternatively, the heat exchanger may be operated in a co-current process, wherein a flow direction of the cooling fluid in the cooling fluid channels is co-directed to the flow direction of the fluid to be cooled in the inner pipe sections. By using a plurality of inner pipe sections, the total surface of the inner pipe sections, which is active during a heat exchange with the cooling fluid, can be increased. Advantageously, the diameters, cross-sections and wall thicknesses of the inner pipe sections may be identical. Thus, a uniform flow through the inner pipe sections with the fluid to be cooled can be realized. Their length can also be similar Advantageously, the inner pipe sections may be uniformly distributed in the pipe bundle, so that uniform gaps can be realized. Advantageously, the diameters and cross-sections of the gaps between the inner pipe sections can be identical. In this way, a uniform flow through the pipe bundle with cooling fluid can be achieved. The ends of the inner pipe sections can lead at equal distances through the end bodies, so that the gaps between the inner pipe sections are also equal there. The inlet chamber may be used as distributor chamber for the fluid to be cooled, so that the fluid to be cooled can be uniformly distributed to the inner pipe sections. Advantageously, the inner pipe sections may be of flexible material, preferably synthetic material. In this way, the shape and/or the course of the pipe bundle can be easily adapted to the shape and the course of the outer pipe section. A bent pipe bundle can also be realized with flexible material. Advantageously, the outer pipe section can also be made of flexible material, preferably synthetic material. Instead of flexible material, the outer pipe section and/or the inner pipe sections can also be made of different material, for example metal, in particular aluminum or an aluminum alloy. In this way, a rigid heat exchanger can be easily realized. A rigid outer pipe section can be stable against mechanical impacts, in particular pressures. Advantageously, the inner pipe sections may be made of a material with high thermal conductivity. The ends of the inner pipe sections can be advantageously firmly bonded to the end bodies in the lead-through openings. They can be advantageously welded and/or glued. Advantageously, the inner ends of the pipe sections may be cast in a tightly hardening material. A sealing effect can be improved with a bonded connection. The end bodies may be advantageously end plates. In this case, one-piece or multi-piece, preferably two-piece end caps may be provided. Preferably, multi-part end plates may be provided with casting chambers with openings for introducing a bonding/sealing material for sealing the lead-through openings opposite the ends of the inner pipe sections. Between the end bodies and the radially inner circumferential sides of the outer pipe section, sealings, preferably annular sealings, may be advantageously disposed to improve a sealing of the coolant chamber to the inlet chamber and to the outlet chamber, respectively. Advantageously, the lead-through openings of the respective end bodies may be uniformly spaced from each other to keep the ends of the inner pipe sections at a uniform distance. The connections of the gaps thus realized between the inner pipe sections allow the cooling fluid to be uniformly distributed in the cooling fluid channels. In this way, the heat exchange can be further improved. Advantageously, the outer pipe section may be disposed between two sections of a fluid line for the fluid to be cooled. It can help to form the fluid line. Advantageously, the fluid line may be a charge air line of a charged internal combustion engine. The heat exchanger can thus realize in a simple and space-saving manner an intercooler to cool the charge air. The heat exchanger can be advantageously disposed between an outlet of a charging unit, preferably of a turbocharger, and an inlet of a suction chamber, so that the available mounting space therein can be utilized efficiently. Advantageously, the cooling fluid can flow parallel or anti-parallel to the liquid to be cooled. In this way, no transverse flow takes place. The cooling efficiency can thus be further increased.

In an advantageous embodiment, the outer pipe section may feature in the area of the upstream end body and the downstream end body a passage for the cooling fluid to the coolant chamber. In the area of the end bodies, the cooling fluid supplied can be distributed uniformly across the cross-section of the outer pipe section and thus flow uniformly to the cooling fluid channels between the inner pipe sections. By distributing the cooling fluid in the area of the end bodies it can be prevented that the cooling fluid takes the shortest way through the nearest cooling fluid channel Advantageously, the passages may be located as close as possible to the corresponding end bodies, so that the gaps between the inner pipe sections can be flowed through almost across their entire length by the cooling fluid. Thus, the active heat exchange surface of the inner pipe sections can be utilized better, so that the overall heat exchange can be improved.

In a further advantageous embodiment, adjacent inner pipe sections may be spaced apart from each other in the area of the end bodies and abut each other in a central section. In this way, the uniform distribution of the cooling fluid in the area of the end bodies to the inner pipe sections can be improved. In the area of the central section, the inner pipe sections contact each other and can thus have heat contact. In this way, the heat transfer between the inner pipe sections can be improved, so that the overall heat exchange can be improved. Furthermore, the cooling fluid channels in the central section are tapered by the inner pipe sections lying against each other. In this way, the flow of cooling fluid and the heat exchange can be improved. The inner pipe sections lying against each other prevent a transverse flow of the cooling fluid, so that the heat exchange can be further improved. Advantageously, the inner pipe sections can contact each other loosely in the area of the central section. In this way, a flexible bending of the pipe bundle can be simplified. However, the inner pipe sections may also be connected with each other in the area of the central section, in particular by welding or gluing. Thus, the stability of the pipe bundle can be enhanced.

Advantageously, the outer pipe section may be tapered in the area of the central section and at least in the central section, the inner pipe sections, which are disposed at the radially outer circumference of the pipe bundle, can abut on the radially inner circumferential side of the outer pipe section. In this way, the flow cross-sections of flow channels between the radially outer circumferential side of the pipe bundle and the radially inner circumferential side of the outer pipe section can be reduced. It can thus be avoided that the cooling fluid flows through these radially outer flow channels instead through the cooling fluid channels between the inner pipe sections. Advantageously, the profile of the flow chambers between the radially outer circumferential side of the pipe bundle and the radially inner circumferential side of the outer pipe section can be similar, preferably identical, to the profile of the gaps between the inner pipe sections inside of the pipe bundle. Advantageously, the inner pipe sections, which are disposed at the radially outer circumferential side of the pipe bundle, can abut on the radially inner circumferential side of the outer pipe section. In this way, a transfer between the pipe sections therein and the outer pipe section can be realized. Furthermore, a transverse flow in the local flow channels can thus be prevented. Thus, the overall heat exchange efficiency can be enhanced.

In a further advantageous embodiment, the inner pipe sections, which are not disposed at the radially outer circumference of the pipe bundle, can be tightly packed, in particular in each case surrounded by six inner pipe sections, in particular in a possibly existing central section abut respectively on six adjacent inner pipe sections. In this way, the cross-sectional areas of the gaps between the inner pipe sections can be reduced. Thus, the overall heat transfer between the cooling fluid and the fluid to be cooled can be further enhanced. Advantageously, the profiles of the gaps, that is, the cooling fluid channels, can be triangular, their sides being bent according to the surfaces of the inner pipe sections.

Furthermore, a radially outer circumferential side of the pipe bundle and a radially inner circumferential side of the outer pipe section can advantageously each have a hexagonal basic profile. The sides of the hexagonal basic profile of the pipe bundle are in this case profiled according to the surfaces of the inner pipe sections. The sides of the hexagonal basic profile of the radially inner circumferential side of the outer pipe section can also be profiled. Thus, the basic profile can be adapted optimally to a tightly packed assembly of the inner pipe sections in the pipe bundle. Thus, a uniform expansion of the pipe bundle can be achieved transversely to the course of the inner pipe sections. As a result of the radially outer circumferential side of the pipe bundle and the radially inner circumferential side of the outer pipe section featuring the same basic profile, allows the gaps between the radially outer circumferential side of the pipe bundle and the radially inner circumferential side of the outer pipe section to be designed uniformly. This has a further positive impact on the flow course and thus on the heat exchange. The radially outer circumferential side of the pipe bundle and the radially inner circumferential side of the outer pipe section may also feature a different type of basic profile, for example a rhombical or trapezoidal basic profile.

In a further advantageous embodiment, a radially inner circumferential side of the outer pipe section may feature a profiling that is at least partially complementary to a profiling of the radially outer circumferential side of the pipe bundle in accordance with the local inner pipe sections. By profiling the radially inner circumferential side of the outer pipe section it can be achieved that the gaps between the inner pipe sections at the outer circumferential side of the pipe bundle and the inside of the outer pipe section are designed in the same way as the gaps between the inner pipe sections inside of the pipe bundle. In this way, a uniform flow through the pipe bundle can be improved also at the radially outer circumferential side of the pipe bundle. Preferably, the profiles of the gaps at the outer circumferential side of the pipe bundle may be identical to the profiles of the gaps inside of the pipe bundle.

The technical object is further solved according to the invention by the assembly with at least one heat exchanger in that at least two heat exchangers are disposed in parallel or in series with respect to a flow direction of the fluid to be cooled.

All the advantages and features listed in conjunction with the heat exchanger according to the invention are valid for the assembly according to the invention and its advantageous embodiments and vice versa. In a parallel arrangement of the heat exchangers the fluid to be cooled can be distributed advantageously from a line section to two heat exchangers. At the outlets of the heat exchangers the cooled fluid can be merged into a common line section. In this way, according to the number of heat exchangers connected in parallel a much greater heat exchanger performance can be achieved with the same flow length and thus with the needed mounting space in longitudinal direction. As an alternative, at least two heat exchangers can be arranged in series. In doing so, the heat exchangers are successively flowed through by the fluid to be cooled. In this way, a constant cross-section of the heat exchanger through the respective enlargement of the flow length can achieve a corresponding increase in heat exchanger performance. Advantageously, a plurality of heat exchangers may be connected parallel to each other and several of these parallel arrangements may in turn be connected in series. As an alternative, a plurality of heat exchangers may be connected in series and several of these serial arrangements may be connected parallel to each other.

Furthermore, the technical problem is solved by the method according to the invention in which a plurality of inner pipe sections is made of synthetic material and disposed in the form of a pipe bundle, the inner pipe sections are inserted through corresponding continuous openings of two adjacent end bodies, continuous openings corresponding to each other of the two end bodies being aligned, the inner pipe sections are cut to length, the two end bodies along the inner pipe sections are moved apart from each other to one end each of the pipe bundle, the pipe bundle in the area of a central section is tapered between the two bodies, the ends of the inner pipe sections are fixed tightly in the continuous openings, the pipe bundle is inserted into an outer pipe section, so that the end bodies tightly abut on a radially inner circumferential side of the outer pipe section.

All the advantages and features listed in conjunction with the above mentioned heat exchanger and the above mentioned assembly are valid accordingly for the method according to the invention and vice versa. Advantageously, the two end bodies can be placed on top of each other so that their respective continuous openings are aligned. In this way, the inner pipe sections can be inserted in one process step through the openings of both end bodies. In this way, the insertion of the inner pipe sections into the openings of the end bodies can be simplified. As a result of the of the inner pipe sections being cut to length before the end bodies are moved away from each other, the ends of the cut side can be disposed inside the openings of the corresponding end bodies without protruding. As a result of the pipe bundle being tapered in the area of the central section before the ends of the inner pipe portions are tightly fixed in the continuous openings, it can be prevented that inner pipe sections, which are disposed in a radially outer area of the pipe bundle, are more mechanically stretched due to a corresponding stronger bending during tapering of the pipe bundle than inner pipe sections in the center of the pipe bundle. In this way, the inner pipe sections can be fixed free of mechanical stress in the end bodies. Tapering of the pipe bundle can be made by compression. For this purpose, in particular an appropriate mold may be used into which the pipe bundle can be placed. Advantageously, the end bodies may each be provided with a corresponding sealing, preferably an annular sealing, which can improve a sealing of the end bodies relative to the radially inner circumferential side of the outer pipe section. Advantageously, the pipe bundle can be placed with the end bodies into a first half shell of the outer pipe section, which is open in longitudinal direction of the outer pipe section. A second half shell for closing the outer pipe section in longitudinal direction can be placed onto the first half shell and connected therewith. The use of a two-part or multi-part outer pipe section has the advantage that even with a curved course of the outer pipe section, the pipe bundle can be easily placed into the outer pipe section. Furthermore, a pipe bundle provided with a tapered central section can in this way be easily placed into a correspondingly shaped outer pipe section. Advantageously, the inner pipe sections can be extruded and disposed in form of the pipe bundle. Advantageously, an appropriate matrix can be used for this purpose. The matrix can advantageously have guide holes for the extruded pipe sections, which are disposed for setting the position of the inner pipe sections. Cutting to length the inner pipe sections can advantageously be done on the matrix. To do this, a knife can advantageously be used which is guided along a surface of the matrix. The blade can be guided along the side of the matrix facing the end bodies. Thus, the blanks for subsequent inner pipe sections can remain in the guide holes of the matrix. In this way, the inner pipe sections can be extruded in a continuous process.

In an advantageous embodiment of the method the ends of the inner pipe sections can be firmly bonded to the end bodies, in particular welded and/or fixed by means of a tightly hardening material. A bonded connection can be realized in a tight and stable manner. For welding the ends of the inner pipe sections, hot mandrels can advantageously be inserted into the ends of the inner pipe sections, which weld the material of the inner pipe sections with the end bodies from the inside. Alternatively, a tightly hardening material can be introduced for gluing in the area of the openings of the end bodies, which can tightly glue the ends of the inner pipe sections with the end bodies. Advantageously, a respective filling port, through which the tightly hardening material can be injected or poured into a casting chamber, which surrounds the ends of the inner pipe sections, can be provided in the corresponding end bodies. Advantageously, a multi-part end plate can be used, one of the end plate parts may feature the corresponding filling port and the casting chamber for the tightly hardening material.

BRIEF DESCRIPTION OF THE DRAWINGS

The accompanying Figs., where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 3 is a detail view of the intercooler in FIG. 2 in the area of an upstream end plate for holding the pipe bundle;

FIG. 4 is a detail view of a cross-section of the intercooler in FIGS. 1 to 3 in the area of a central section of the pipe bundle;

FIGS. 9 to 14 depict a pipe bundle with one-piece end plates of an intercooler, which is similar to the pipe bundle of the intercooler in FIGS. 1 to 8 in different manufacturing steps;

FIGS. 15 to 19 depict an alternative pipe bundle with two-piece end plates of an intercooler, which is similar to the pipe bundle of the intercooler in FIGS. 1 to 8 in different manufacturing steps;

FIG. 20 a further example of an embodiment of an intercooler, which is similar to the intercooler in FIGS. 1 to 8, an outer pipe and the pipe bundle of the intercooler being bent in the central section;

FIG. 21 depicts a parallel assembly of two intercoolers, which correspond to the intercooler in FIGS. 1 to 8;

FIG. 22 depicts a serial assembly of two intercoolers, which correspond to the intercooler in FIGS. 1 to 8; and FIG. 23 is an assembly view of an intercooler according to the intercooler in FIGS. 1 to 8 as pre-cooler in front of a compact heat exchanger.

Figure 1:
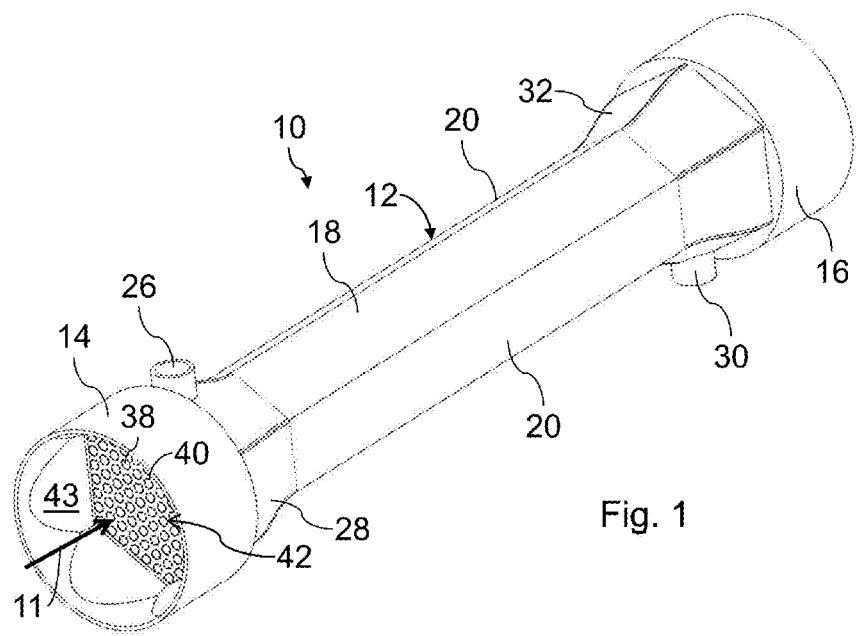
FIG. 1 is an isometric representation of an intercooler of a charge air line of a charged internal combustion engine of a motor vehicle with a pipe bundle for guiding the charge air.

Please note that identical components in the Figs. have the same reference numerals. Skilled artisans will appreciate that elements in the Figs. are illustrated for simplicity and clarity and have not necessarily been drawn to scale. For example, the dimensions of some of the elements in the Figs. may be exaggerated relative to other elements to help to improve understanding of embodiments of the present invention.

DETAILED DESCRIPTION

Before In FIGS. 1 to 8, an intercooler 10 for charge air of a charged internal combustion engine of a motor vehicle is shown in different perspectives and operating modes.

Figure 2:
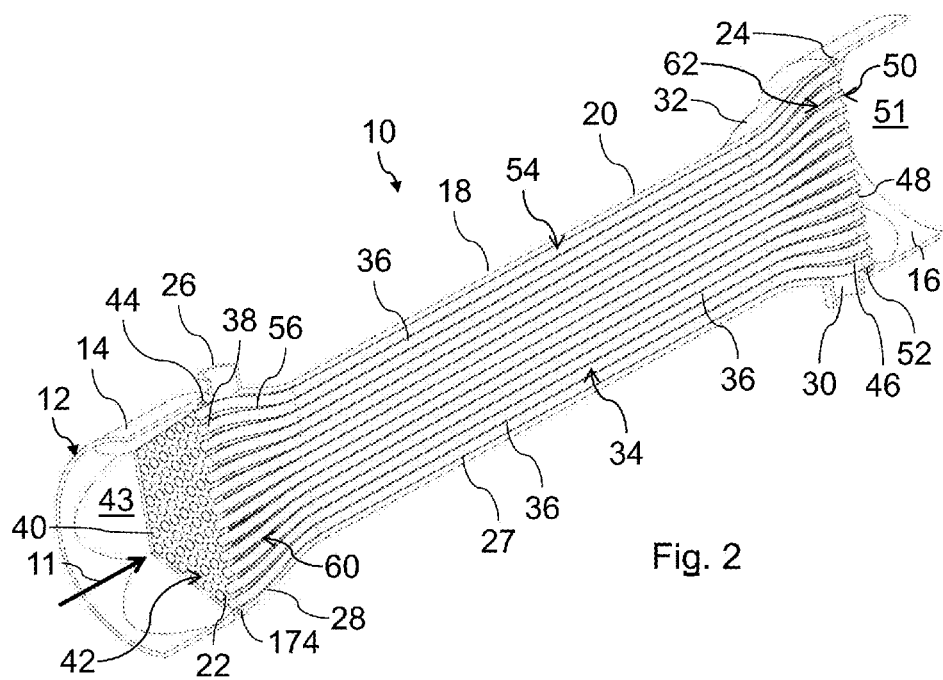
FIG. 2 shows the intercooler of FIG. 1 which is open in longitudinal direction, the pipe bundle being represented in a longitudinal section.

The intercooler 10 comprises an outer pipe 12 featuring an inlet pipe section 14, an outlet pipe section 16 and an intermediate center pipe section 18. A flow direction of the charge air to be cooled is shown by arrows 11 in FIGS. 1 to 3. The outer pipe 12 is split in longitudinal direction and composed of two half shells 20. In FIG. 2, the outer pipe 12 open in longitudinal direction is shown with one of the half shells 20. The center pipe section 18 is tapered relative to the inlet pipe section 14 and the outlet pipe section 16. The radially outer circumferential side and the radially inner circumferential side of the center pipe section 18 have a hexagonal cross-section. The radially inner circumferential side of the center pipe section 18 merges into the radially inner circumferential side of the inlet pipe section 14 and of the outlet pipe section 16, which also have a hexagonal cross-section.

The radially outer circumferential sides of the inlet pipe section 14 and of the outlet pipe section 16 each have a circular cross-section. On the side facing the center pipe section 18, the inlet pipe section 14 features a circumferential receiving groove 22. Accordingly, the outlet pipe section 16 features a circumferential receiving groove 24. The radially outer circumferences of the receiving grooves 22 and 24 have a circular cross-section. Their radially inner edges have a hexagonal profile in accordance with the hexagonal profile of the radially inner circumferential side of the outlet pipe section 16 and the inlet pipe section 14.

Seen from the inlet pipe section 14 directly behind the receiving groove 22 is provided in the outer pipe 12 an upstream passage 26 relative to the charge air flow for coolant of the intercooler 10. Preferably, liquid coolant is used. As an alternative, gaseous coolant may also be used. The upstream passage 26 leads into a coolant chamber 27 inside of the outer pipe 12. As will be explained in detail below, the passage 26 may, according to the operating mode, be used as inlet or as outlet for the coolant. The upstream passage 26 is located in a conical transition area 28 between the inlet pipe section 14 and the center pipe section 18.

Seen from the center pipe section 18 in front of the downstream receiving groove 24, the outer pipe 12 features a downstream passage 30 for the coolant to the coolant chamber 27. The downstream passage 30 is located on the circumferential side of the outer pipe 12 opposite the upstream passage 26. The downstream passage 30 is located in a conical transition area 32 between the center pipe section 18 and the outlet pipe section 16.

The passages 26 and 30 are each connected with a line section of a coolant line of a coolant circuit not shown.

A pipe bundle 34 is disposed in the outer pipe 12 with a plurality of inner pipes 36 in such a way that the inner pipes 36 extend in longitudinal direction of the outer pipe 12. In FIG. 2, the pipe bundle 34 is shown in a longitudinal section. The inner pipes 36 have the same profile with the same external diameter and internal diameter. Their upstream free ends 38 are secured tightly in respective continuous inlet openings 40 in an upstream end plate 42. The end plate 42 is round. It is made of synthetic material. The inner pipes 36 lead through the upstream end plate 42. The upstream ends 38 of the inner pipes 36 are each welded in the inlet openings 40 with the end plate 42. The inlet openings 40 are uniformly distributed in the upstream end plate 42, so that also the upstream ends 38 of the inner pipes 36 seen in profile are uniformly distributed.

The upstream end plate 42 is disposed tightly in the receiving groove 22. An annular sealing 44 is disposed in a sealing groove 174 in the radially outer circumferential side of the upstream end plate 42. The upstream end plate 42 separates an inlet chamber 43 in the inlet pipe section 14 tightly from the coolant chamber 27.

Downstream ends 46 of the inner pipes 36 are attached in outlet openings 48 of a circular downstream end plate 50 in analogy to the upstream ends 38. The end plate 50 is made of synthetic material. The downstream ends 46 of the inner pipes 36 are each welded in the outlet openings 48 with the end plate 50. The downstream end plate 50 is disposed in the downstream receiving groove 24. The downstream end plate 50 separates an outlet chamber 51 in the outlet pipe section 16 tightly from the coolant chamber 27. An annular sealing 52 is disposed in a sealing groove of the downstream end plate 50. The outlet openings 48 are uniformly distributed across the downstream end plate 50, so that the downstream ends 46 of the inner pipes 36 are uniformly distributed across the cross-section of the outlet pipe section 16.

In the area of the center pipe section 18 of the outer pipe 12, the pipe bundle 34 is tapered into a bundle central section 54. There are inner pipes 36 loosely adjacent to each other. The inner pipes 36 are disposed is such a way that the inner pipes 36, which are not located at the radially outer circumferential side of the pipe bundle 34, each have six adjacent inner pipes 36. In the area of the bundle central section 54, each of these inner pipes 36 contacts each of the six adjacent inner pipes 36. Thus, the inner pipes 36 are tightly packed in the bundle central section 54. Gaps between the inner pipes 36 form coolant channels 56 for the coolant. As can be seen in FIG. 4, the coolant channels 56 have an approximately triangular profile with inwardly bent sides in the bundle central section 54. The profile of the gaps and thus of the coolant channels 56 is identical.

The radially outer circumferential side of the pipe bundle 34 has according to the radially inner circumferential side of the outer pipe 12 a hexagonal base profile. The inner pipes 36, which are located on the radially outer circumferential side of the pipe bundle 34, are loosely adjacent to the radially inner circumferential side of the center pipe section 18 of the outer pipe 12. The radially inner circumferential side of the center pipe section 18 features a profiling 58, which is complementary to a profiling of the radially outer circumferential side of the pipe bundle 34. In this way, the profile of the coolant channels 56 defined each by two adjacent inner pipes 36 and an intermediate area of the radially inner circumferential side of the center pipe section 18 is identical with the coolant channels 56 inside of the pipe bundle 34. In this way, a uniform flow through the pipe bundle 34 with coolant can be realized also in the area of the radially outer circumferential side.

In the transition areas 28 and 32 of the outer pipe 12, the inner pipes 36 are spaced, so that a distributor chamber section 60 and 62 each of the coolant chamber 27 is formed, in which the coolant can be uniformly distributed before entering the coolant channels 56 and after leaving the coolant channels 56. In this way, a uniform distribution of the coolant to the coolant channels 56 and a uniform outflow from the coolant channels 56 will be realized. The passages 26 and 30 lead each into the corresponding distributor chamber section 60 and 62.

Figure 5:
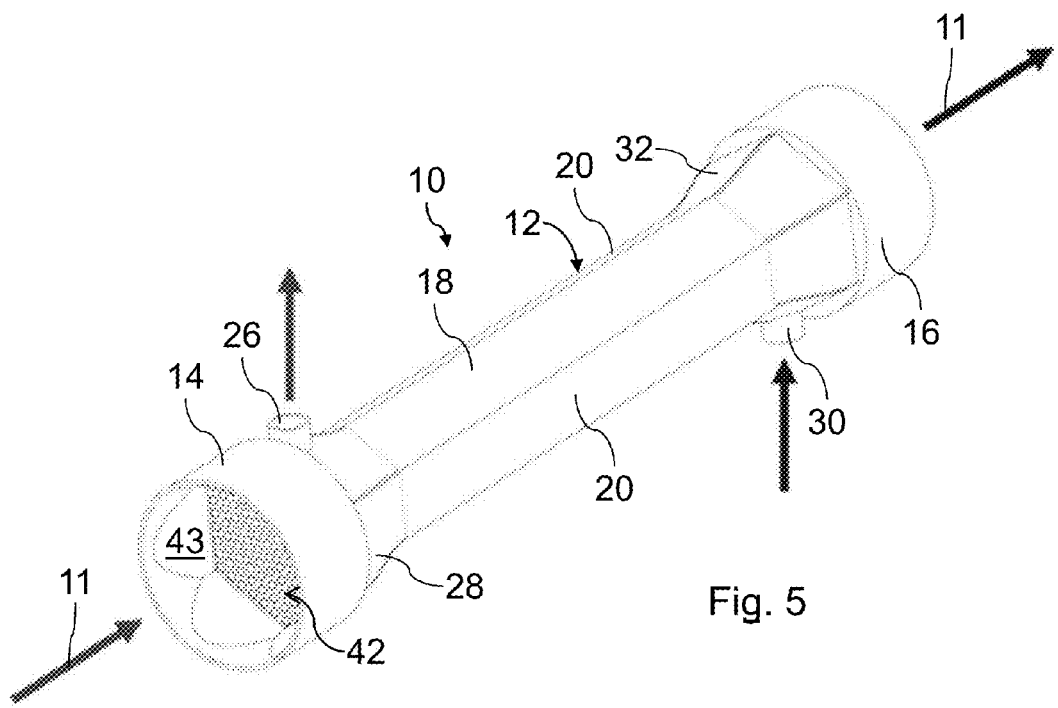
FIG. 5 shows the intercooler of FIGS. 1 to 4 operated in counter-current process.
Figure 6:
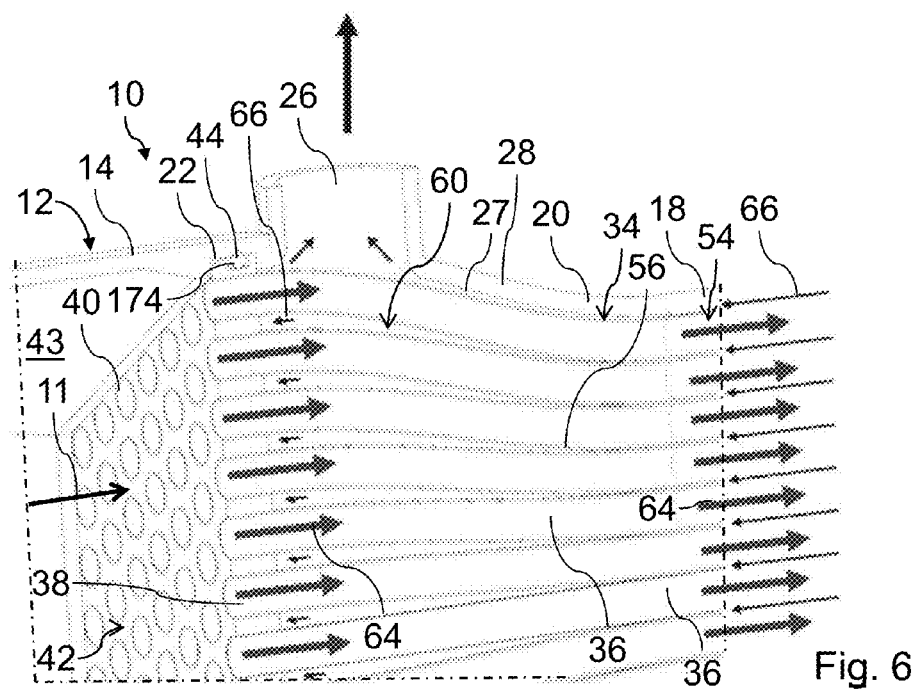
FIG. 6 shows a detail view of a longitudinal section of the intercooler in FIG. 5.
Figure 7:
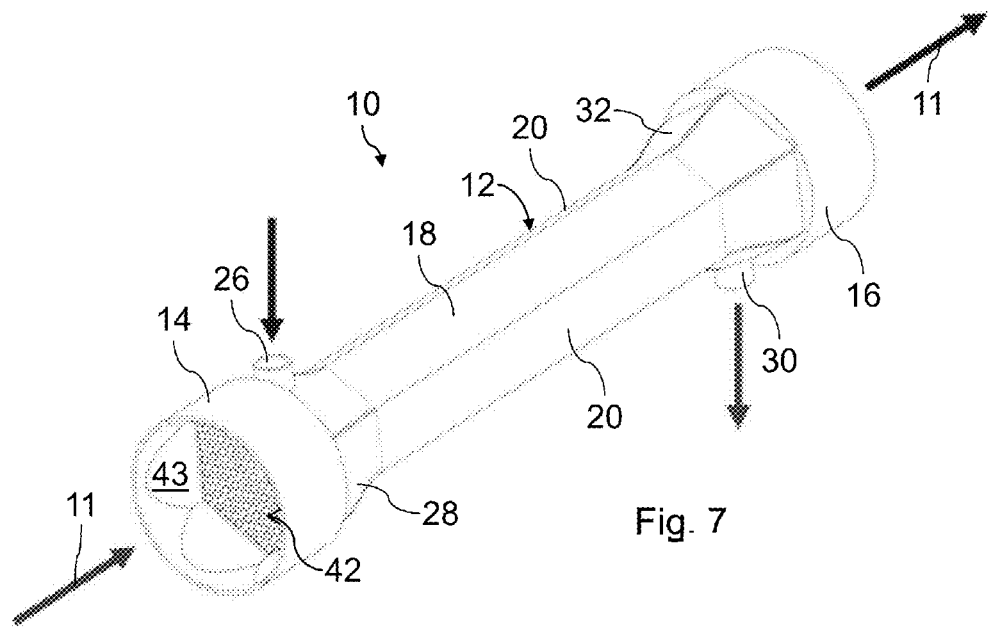
FIG. 7 shows the intercooler of FIGS. 1 to 4 operated in co-current process.
Figure 8:
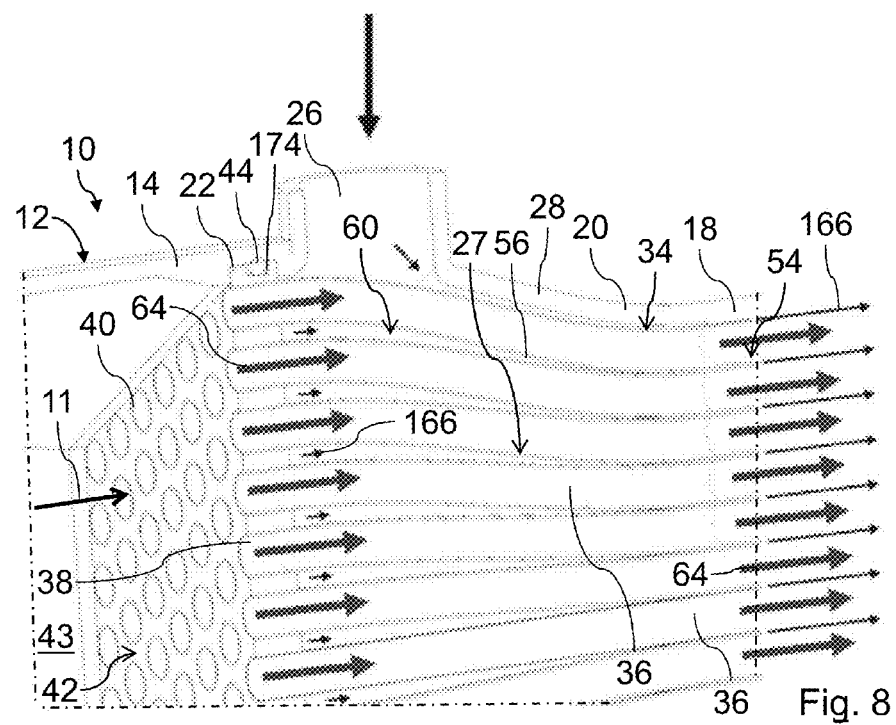
FIG. 8 is a detail view of a longitudinal section of the intercooler in FIG. 7.

As shown in FIGS. 5 and 6 and FIGS. 7 and 8, during operation of the intercooler, the charge air to be cooled flows in the flow direction 11 from the corresponding line section of the charge air line to the inlet chamber 43 of the intercooler 10. There, the charge air to be cooled is uniformly distributed to the upstream ends 38 of the inner pipes 36. The charge air to be cooled flows through the inner pipes 36, as indicated in FIGS. 6 and 8 by arrows 84. When flowing through the inner pipes 36, the charge air is cooled. The cooled charge air passes through the downstream ends 46 into the outlet chamber 51. There, it is collected and leaves the intercooler 10.

The intercooler 10 may be operated according to a counter-current process, shown in FIGS. 5 and 6, or according to a co-current process, shown in FIGS. 7 and 8.

In the counter-current process, the coolant is supplied from the coolant circuit through the downstream passage 30 to the downstream distributor chamber section 62 of the coolant chamber 27. The distances of the inner pipes 36 allow the coolant to be distributed uniformly across the cross-section of the distributor chamber section 62. The coolant flows uniformly to the coolant channels 56 between the inner pipes 36. The coolant flows against the flow direction 64 of the charge air, indicated in FIG. 6 by arrows 66, through the coolant channels 56. Heat is transferred from the charge air to be cooled through the inner pipes 36 to the coolant, so that the charge air in the inner pipes 36 is cooled. The coolant flows from the coolant channels 56 into the upstream distributor chamber section 60 where it is collected. It passes through the upstream passage 26 from the coolant chamber 27 back into the coolant circuit.

During operation of the co-current process, shown in FIGS. 7 and 8, and unlike the counter-current process, the coolant is supplied through the upstream passage 26 to the upstream distributor chamber section 60. It flows in the direction of the charge air flow 64 through the coolant channels 56, indicated in FIG. 8 by arrows 166, thus cooling the charge air. The coolant leaves the coolant channels 56 and reaches the downstream distributor section 62. The coolant exits the intercooler 10 through the downstream passage 30.

In FIGS. 9 to 14 some process steps of a method for manufacturing a pipe bundle 134 with end plates 142 and 150 are shown by way of an example, which may be used for the intercooler 10 in FIGS. 1 to 8. Those elements that are similar to those of the example of an embodiment of the intercooler 10 in FIGS. 1 to 8, have the same reference numerals. Unlike the pipe bundle 34, the pipe bundle 134 features a smaller number of inner pipes 36.

The inner pipes 36 are extruded with the aid of a matrix 168 made of synthetic material. The matrix 168 is a hexagonal disc. The matrix 168 features a plurality of guide holes 170, which are disposed according to the later assemblies of the inner pipes 36 in the pipe bundle 134, and through which the extruded inner pipes 36, as indicated in FIG. 9, are inserted in the direction of an arrow 172.

An upstream end plate 142 and a downstream end plate 150 are, as shown in FIG. 10, placed onto the pipe bundle 134. The end plates 142 and 150 are each made in one piece. The upstream end plate 142 features inlet openings 40 and the downstream end plate 150 features outlet openings 48 for the inner pipes 36. The arrangement of the inlet openings 40 and the outlet openings 48 corresponds to the arrangement of the guide holes 170. The end plates 142 and 150 are placed next to each other in such a way that an inlet opening 40 each of the upstream end plate 142, an outlet opening 48 of the downstream end plate 150 and one of the guide holes 170 of the matrix 168 are aligned.

Figure 11:
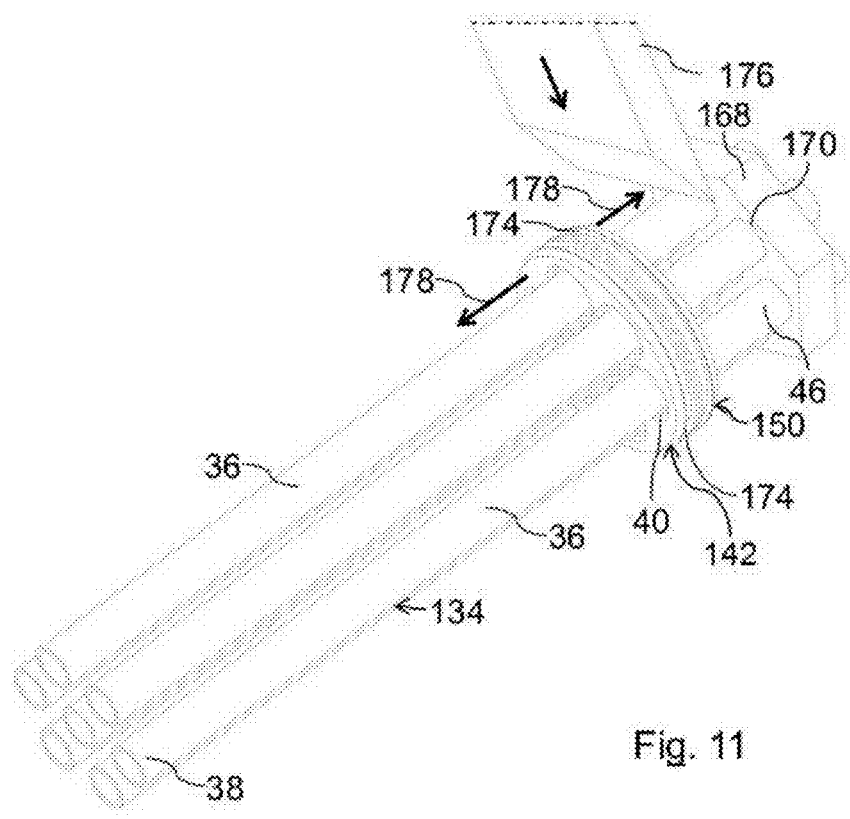

Once the inner pipes 36 have the desired length, they are, as shown in FIG. 11, cut to length with a knife 176 along the surface of the matrix 168 facing the end plates 142 and 150.

Figure 12:
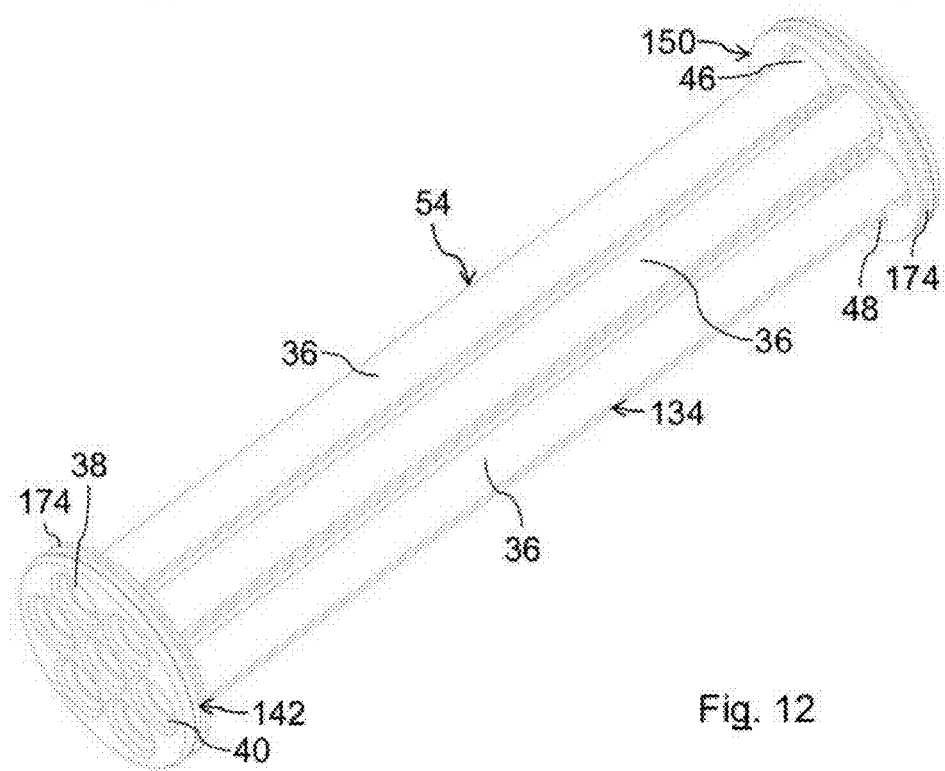

Subsequently, as shown in FIG. 12, the upstream end plate 142 on the inner pipes 36 is pushed away from the downstream end plate 150 to the upstream ends 38 of the inner pipes 36. The downstream end plate 150 is moved to the downstream ends 46. The pushing directions are indicated in FIG. 11 by arrows 178. In this phase of the manufacturing process, the upstream ends 38 are disposed loosely in the inlet openings 40 and the downstream ends 46 are disposed loosely in the outlet openings 48, so that they can be moved in the longitudinal direction in the end plates 142 and 150.

Figure 13:
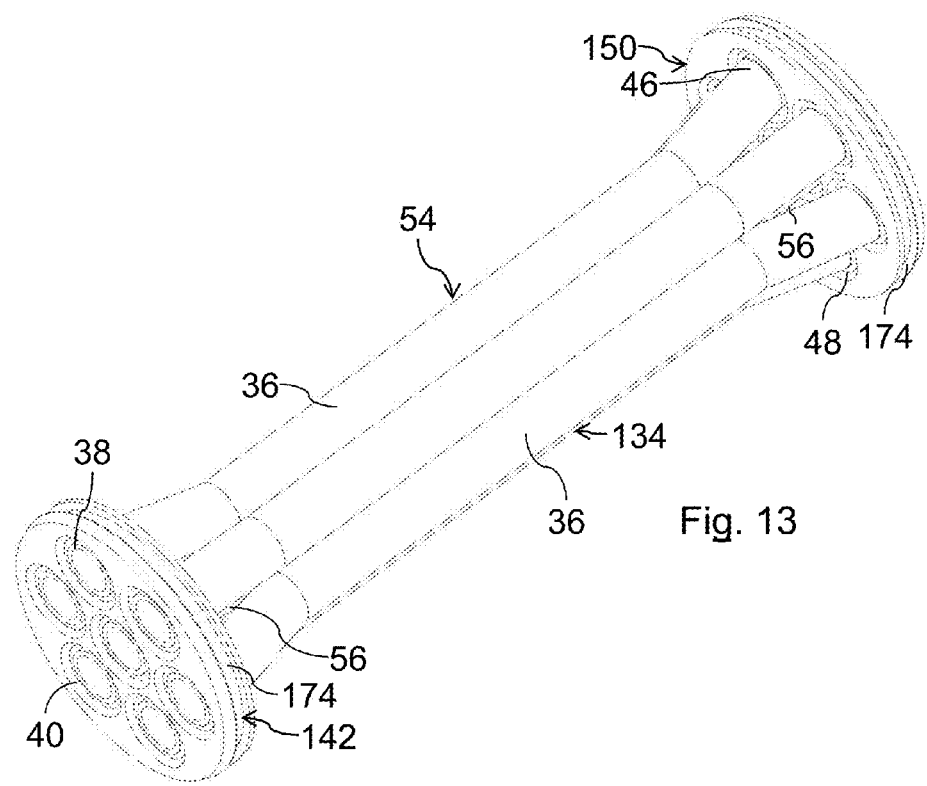

In another process step, as shown in FIG. 13, the pipe bundle 134 is tapered in the bundle central section 54. In this case, the eccentric inner pipes 36 are bent toward the center of the pipe bundle 134. The closer the radially inner pipes 36 are located at the center of the pipe bundle 134, the lower is the required amount of bending. As a result of the ends 38 and 46 still being held loosely in the end plates 142 and 150, a mechanically stress-free bending can occur. The pipe bundle 134 is tapered until the inner pipes 36 in the area of the bundle central section 54 are close to each other.

Figure 14:
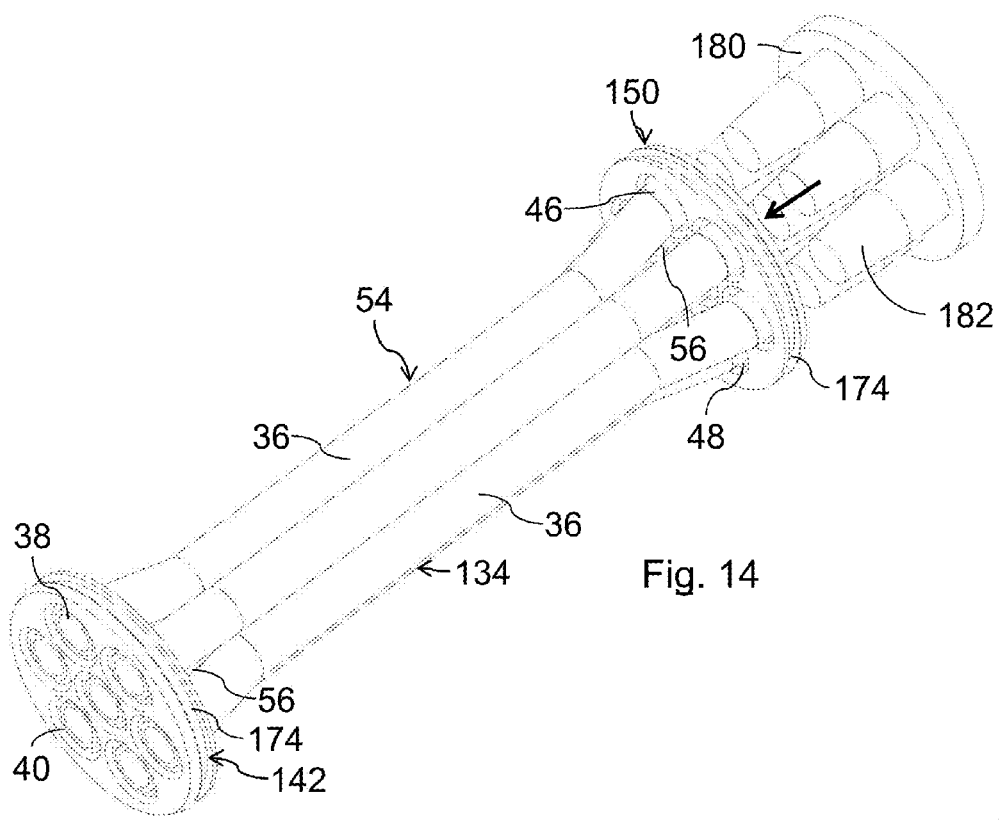

Subsequently, as shown in FIG. 14, the downstream ends 46 in the respective outlet openings 48 are welded to the downstream end plate 150. For this purpose, a mandrel plate 180 with hot mandrels 182, which are disposed according to the outlet openings 48, is fitted into the open ends 46. Due to the heat, the ends 46 are firmly bonded to and sealed to the downstream end plate 150. Accordingly, the upstream ends 38 are sealingly connected with the upstream end plate 142. As an alternative, the upstream ends 38 can first be connected with the upstream end plate 142, and then the downstream ends 46 with the downstream end plate 150. The connection of the ends 38 and 46 with the corresponding end plates 142 and 150 can also be done in one step, for example using two mandrel plates 180.

Annular sealings, which are not shown, are inserted into the corresponding sealing grooves 174 of the end plates 142 and 150. The pipe bundle 134 is inserted into one of the half shells of the outer pipe, the end plates 142 and 150 being inserted into the respective holding fixtures in the radially inner circumferential side of the outer pipe. Subsequently, the second half shell of the outer pipe is mounted, and both half shells are sealingly connected with each other. In this case, the connection can, for example, be realized by means of a welded connection or a glued connection. A different type of connection, such as a screwed connection or a snap-in connection, may also be provided.

In FIGS. 15 to 19, some process steps of an alternative manufacturing method for a pipe bundle 134 with end plates 242 and 250 are shown as an example. Those elements that are similar to those of the example of an embodiment of the method in FIGS. 9 to 14, have the same reference numerals. As in the method according to the first example of an embodiment, the inner pipes 36 are first, according to the second example of an embodiment, extruded with the aid of the matrix 168 according to FIG. 9.

Unlike the example of an embodiment in FIGS. 9 to 14, the upstream end plate 242 and the downstream end plate 250 seen in longitudinal direction are each made in two parts, as shown in FIGS. 15 to 19. The end plates 242 and 250 feature each a first end plate part 243 and a second end plate part 245. The end plate parts 243 and 245 of the upstream end plate 242 feature the inlet openings 40 for the inner pipes 36. The inlet openings 40 extend each through the end plate part 242 and the end plate part 245. The end plate parts 243 and 245 of the downstream end plate 250 feature the outlet openings 48 for the inner pipes 36. The outlet openings 48 extend each through the end plate part 243 and the end plate part 245. The arrangement of the inlet openings 40 and the outlet openings 48 corresponds to the arrangement of the guide holes 170 in the matrix 168.

After the extrusion of the inner pipes 36, the end plates 242 and 250 are, as shown in FIG. 15, placed onto the inner pipes 36, so that the respective first end plate parts 243 face each other and abut against each other.

The respective second end plate parts 245 features each a casting chamber 284 that surrounds the inner pipes 36 leading therethrough and connects their gaps with each other. The casting chambers 284 feature each a filling port 286 on the radially outer circumferential side of the respective second end plate part 245. Furthermore, the first end plate parts 243 feature each a lug 288 which engages in a corresponding holding fixture 290 of the respective second end plate part 245.

Once the inner pipes 36 have the desired length, they will be, as shown in FIG. 16, similar to the first example of an embodiment cut with the knife 176 along the surface of the matrix 168 facing the end plates 242 and 250.

Figure 17:
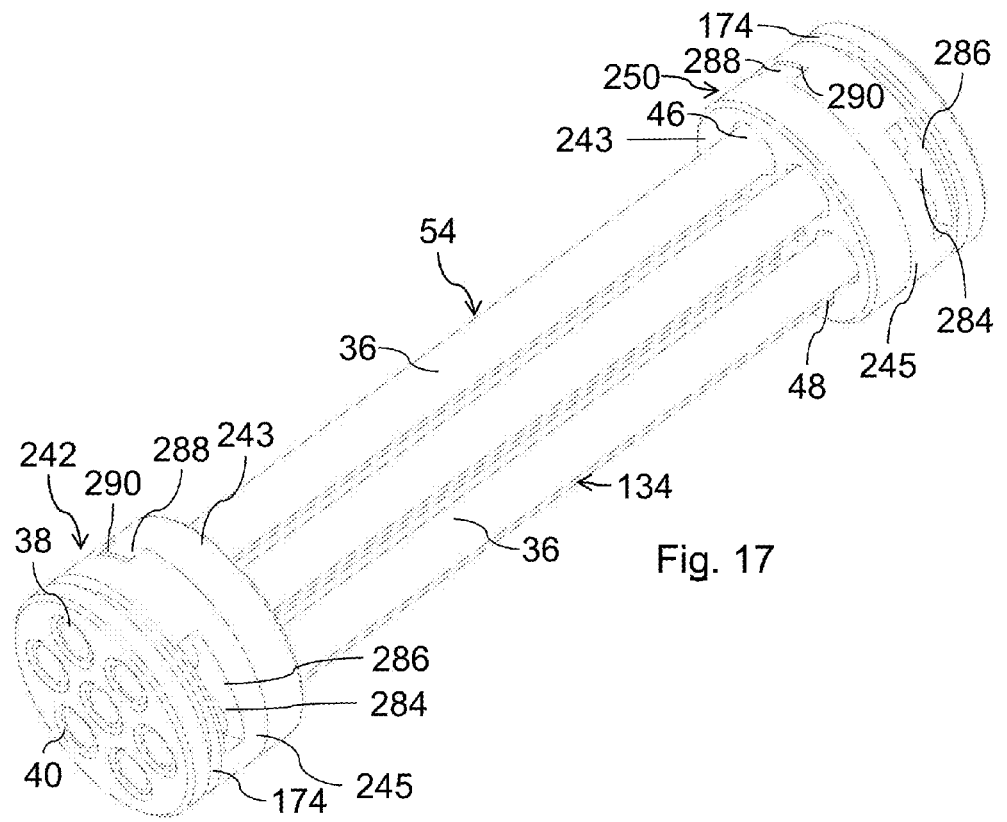
Figure 18:
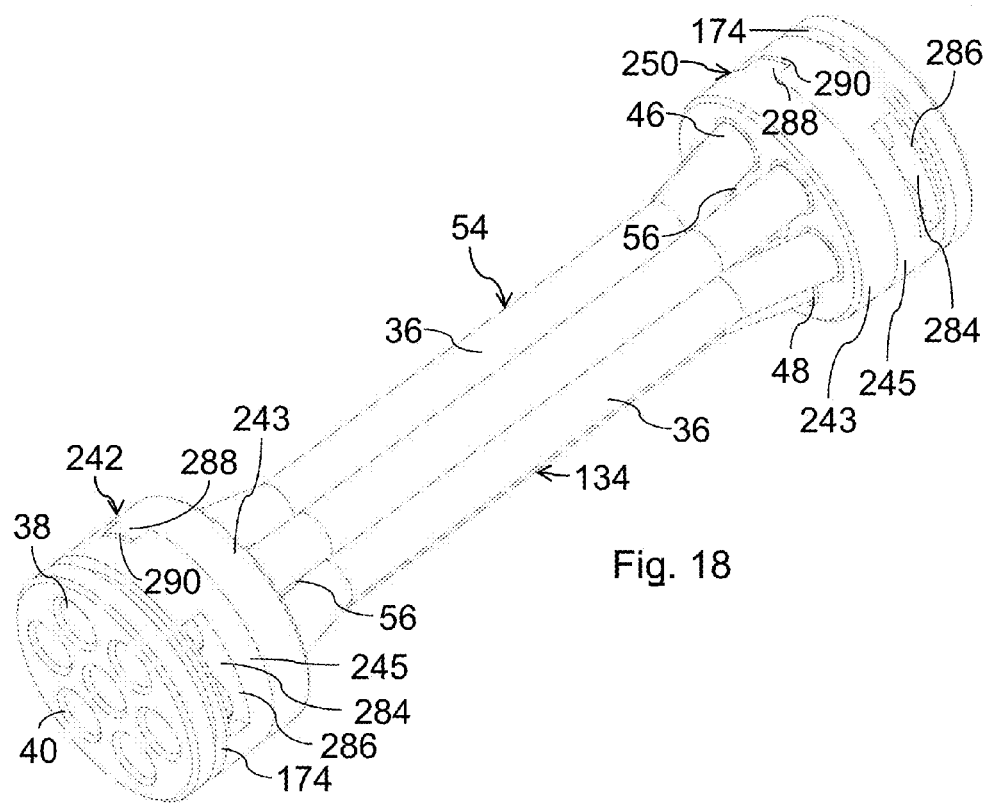

Subsequently, similarly to the first example of an embodiment, the end plates 242 and 250 are drawn apart and placed at the respective ends 38 and 46 of the inner pipes 36. This is shown in FIG. 17.

Then, the pipe bundle 134 is tapered according to the first example of an embodiment in the bundle central section 54, so that the inner pipes 36 there are close to each other. In this phase of the manufacturing process, the ends 38 and 46 are still supported movably in the axial direction in the end plates 242 and 250.

Figure 19:
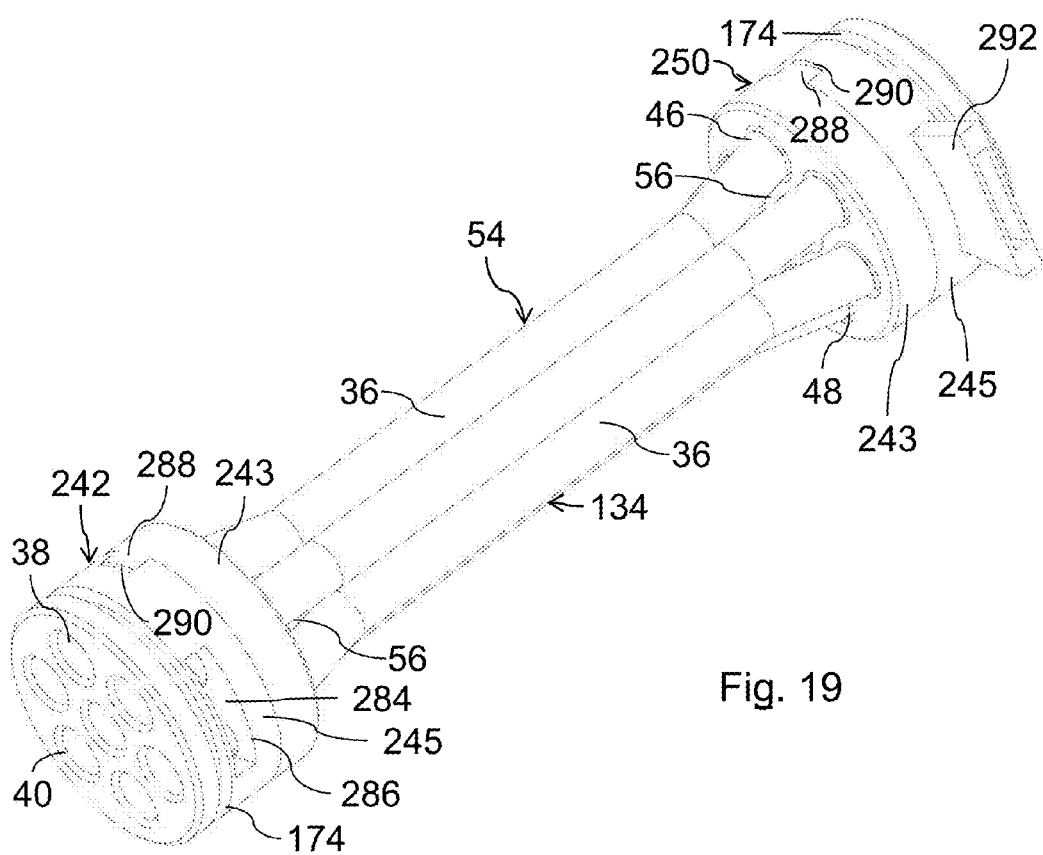

Subsequently, as shown in FIG. 19, a hopper 292 is inserted into the filling port 286 of the second end plate part 245 of the downstream end plate 250. A tightly hardening material in the form of a liquid adhesive is filled through the hopper 292 and the filling port 286. The adhesive is distributed in the casting chamber 284 and sealingly embeds therein the downstream ends 46 of the inner pipes 36 in the second end plate part 245. Once the adhesive is hardened, the downstream ends 46 are held tightly in the corresponding outlet openings 48 of the second end plate part 245. Accordingly, adhesive is filled into the second end plate part 245 of the upstream end plate 242 so that the upstream ends 38 of the inner pipes 36 are sealingly embedded in the second end plate part 245 of the upstream end plate 242. The hopper 292 is now removed. As an alternative, the upstream ends 38 of the inner pipes 36 in the upstream end plate 242 can be embedded first and then the downstream ends 46 in the downstream end plate 250. The embedding of the upstream ends 38 and the downstream ends 46 may also be done in one operation.

The annular sealings are inserted into the sealing grooves 174 in the second end plate part 245. Subsequently, the pipe bundle 134 is inserted similarly to the first example of an embodiment into the first of the half shells of the outer pipe 12. The outer pipe is closed by the second half shell. The two half-shells are tightly connected with each other, they are in particular welded or glued.

FIG. 20 shows another example of an embodiment of an intercooler 310. Those elements that are similar to those of the example of an embodiment of the intercooler 10 in FIGS. 1 to 9, have the same reference numerals. Unlike the intercooler 10 of the first example of an embodiment, the two half shells 320 of the outer pipe 312 and the pipe bundle 334 therein are bent in the area of the central pipe section 318 and the bundle central section, respectively, in the second example of an embodiment.

FIG. 21 shows an example of an embodiment of a parallel assembly of two intercoolers 10 according to the intercooler 10 in FIGS. 1 to 9. The inlet pipe sections 14 and the outlet pipe sections 16 of the two intercoolers 10 are each connected with each other by means of a manifold 94 and connected with the corresponding line section of the charge air line, which is not shown.

FIG. 22 shows an example of an embodiment of a serial assembly of two intercoolers 10 according to the intercooler 10 in FIGS. 1 to 9. In this connection, the two intercoolers 10 are connected in series one after the other, the outlet pipe section 16 of the upstream intercooler 10 being connected with the inlet pipe section 14 of the downstream intercooler 10.

As an example, FIG. 23 shows a use of the intercooler 10 in FIGS. 1 to 9 as pre-cooler in front of a compact heat exchanger 96.

In all above described examples of an embodiment of an intercooler 10; 310, an assembly of intercoolers 10 and a method for manufacturing an intercooler 10, the following modifications are among others possible:

The invention is not limited to an intercooler 10; 310 of a charged internal combustion engine of a motor vehicle. Rather, it can also be used with different internal combustion engines, for example with industrial engines. It can also be used in other types of heat exchangers for cooling a fluid of an internal combustion engine such as a gas or a liquid.

The inner pipes 36 may also have different inner diameters and/or outer diameters.

Instead of being loosely held together, the inner pipes 36 may also be connected with each other in the area of the bundle central section 54. They may, for example, be glued or welded.

Instead of being loosely held at the radially inner circumferential side of the center pipe section 18; 318, the inner pipes 36 may also be connected with it in the area of the bundle central section 54. They may, for example, be glued or welded with it.

Instead of being welded with the one-piece end plates 42; 142 and 50; 150, the ends 38 and 46 of the inner pipes 36 in the examples of an embodiment in FIGS. 1 to 14 may also be connected tightly therewith in different ways. They may, for example, also be connected tightly by means of a different type of bonded connection, for example by means of a glued connection, with the corresponding end plates 42; 142 and 50; 150. Accordingly, when using multi-part end plates 242 and 250, as shown in the example of an embodiment in FIGS. 15 to 19, the ends 38 and 46 may be welded with the end plates 242 and 250.

Instead of being made of synthetic material, the end plates 42; 142; 242 and 50; 150; 250 and/or the inner pipes 36 and/or the outer pipe 12; 312 may also be made of a different material, for example a metal, for example aluminum or an aluminum alloy.

In the foregoing specification, specific embodiments of the present invention have been described. However, one of ordinary skill in the art appreciates that various modifications and changes can be made without departing from the scope of the present invention as set forth in the claims below. Accordingly, the specification and Figs. are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A heat exchanger cooling a charging fluid of a charged internal combustion engine, comprising:
    an outer pipe section including
        an inlet end; and
        an outlet end;
    a plurality of inner pipe sections arranged within said outer pipe section and extending between said inlet end and said outlet end and open at both opposing ends, said plurality of inner pipe sections defining a plurality of channels for the fluid to be cooled therein;
    at least one cooling fluid channel conducting a cooling fluid and arranged within said outer pipe section;
    wherein the at least one cooling fluid channel is in heat transfer contact with said one channel for the fluid to be cooled;
    wherein said at least one cooling fluid channel is separated fluid-tightly from said one channel for the fluid to be cooled;
    wherein said plurality of inner pipe sections, which are open each at both ends, are arranged together as a pipe bundle;
    wherein said plurality of inner pipe sections engage with and are sealably connected at a first end to a respective lead-through opening of an upstream end body;
    wherein said plurality of inner pipe sections engage with and are sealably connected at an opposing second end to a respective lead-through opening of a downstream end body;
    wherein said upstream end body separates fluid-tightly an inlet chamber of the outer pipe section from a coolant chamber arranged within said inner pipe sections;
    wherein said downstream end body separates fluid-tightly an outlet chamber of the outer pipe section from the coolant chamber arranged within said inner pipe sections; and
    wherein said inner pipe sections fluidically interconnects said inlet chamber to said outlet chamber;
    wherein adjacent inner pipe sections of said plurality of inner pipe sections are spaced apart from each other in the area of the end bodies and abut together in a longitudinal central section of said outer pipe section, the central section arranged between the end bodies;
    wherein the outer pipe section is tapered radially inwardly in the central section relative to the end bodies such that the central section has a smaller inner diameter than the end bodies.

2. The heat exchanger according to claim 1, wherein said plurality of inner pipe sections are spaced apart at a greater distance and in an area of said upstream end body and the downstream end body relative to spacing within the longitudinal central section of said outer pipe section;
    wherein said greater spacing at said area of outer pipe section includes in the area of the upstream end body and the downstream end body a fluid passage distributing cooling fluid to said cooling fluid channels.

3. The heat exchanger according to claim 1, wherein the outer pipe section is tapered radially inwardly from the end bodies to the central section; and
    wherein inner pipe sections of said plurality of inner pipe sections disposed at a radially outer circumference of said pipe bundle abut against a radially inner circumferential side of said longitudinal central section of the outer pipe section.

4. The heat exchanger according to claim 1, wherein
said the inner pipe sections of said plurality of inner pipe sections which are not disposed at the radially outer circumference of the pipe bundle are tightly packed and abutting against each other, each of said inner pipe sections of said plurality of inner pipe sections which are not disposed at the radially outer circumference of the pipe bundle surrounded each by six abutting inner pipe sections within said central section.

5. The heat exchanger according to claim 1, wherein
a radially outer circumferential side of said pipe bundle and a radially inner circumferential side of said outer pipe section each have a radially hexagonal profile in a radial direction relative to a longitudinal axial direction of said outer pipe section such that said pipe bundle is received within and abuts against said radially inner circumferential side of said outer pipe section.

6. The heat exchanger according to claim 1, wherein
a radially inner circumferential side of the outer pipe section has a radial cross sectional profile that is at least partially complementary to a radial cross sectional profile of the radially outer circumferential side of said pipe bundle in accordance with said plurality of pipe sections therein.

7. An assembly with at least one heat exchanger according to claim 1, comprising:
an outer pipe section in which is disposed said plurality of inner pipe sections with at least one channel for the fluid to be cooled; and
in which is disposed at least one cooling channel for a cooling fluid;
the at least one cooling channel and the at least one channel for the fluid to be cooled being sealed fluidically against each other and in heat transfer contact;
wherein at least two heat exchangers are disposed in parallel or in series relative to a flow direction of the fluid to be cooled.

8. A method of manufacturing a heat exchanger for cooling a fluid of an internal combustion engine of claim 1, comprising:
providing a plurality of inner pipe sections is made of synthetic material;
forming said plurality of inner pipe sections in the form of a pipe bundle wherein longitudinally central portions of said inner pipe sections are tightly packed an abut against each other and longitudinally outer sections of said plurality of inner pipe sections are have a large radial spacing so as not to abut against adjacent inner pipe sections;
providing two end bodies having a plurality of continuous openings extending there through;
inserting a first end of pipe sections of said plurality of inner pipe sections through corresponding continuous openings of a first one of said end bodies;
inserting a second end of pipe sections of said plurality of inner pipe sections through corresponding continuous openings of a second one of said end bodies;
wherein said pipe bundle in an area of a central section is tapered radially inwardly between the first and second end bodies;
seal tightly securing said first and second ends of said plurality of inner pipe sections into the continuous openings of respective ones of said first and second end bodies; and
inserting said pipe bundle into an outer pipe section, so that the end bodies tightly abut against a radially inner circumferential side of said outer pipe section.

9. The method of manufacturing a heat exchanger according to claim 8, wherein
said end of said plurality of inner pipe sections are firmly bonded and secured to the first end second end bodies, said bonding by welding and/or fixed by means of a tightly hardening material.

* * * * *